July 9, 1968  C. W. CALHOUN, JR., ET AL  3,391,730
LIQUID DISPENSING UNIT AND PARTS THEREFOR OR THE LIKE
Filed Feb. 8, 1966  2 Sheets-Sheet 1

INVENTORS
CLINTON W. CALHOUN, JR.
FRANK B. HART, JR.

BY

THEIR ATTORNEYS

United States Patent Office 3,391,730
Patented July 9, 1968

3,391,730
LIQUID DISPENSING UNIT AND PARTS THEREFOR OR THE LIKE
Clinton W. Calhoun, Jr., Henrico County, and Frank B. Hart, Jr., Richmond, Va., assignors to Reynolds Metals Company, Richmond, Va., a corporation of Delaware
Filed Feb. 8, 1966, Ser. No. 525,900
14 Claims. (Cl. 165—47)

ABSTRACT OF THE DISCLOSURE

This disclosure relates to a self-contained serving and supporting tray for holding a dispensing container in its dispensing condition, the tray having a chamber therein receiving a heat exchanging medium which will effectively maintain the beverage in the dispensing container supported thereon at the desired temperature even though the dispensing container is readily liftable from such serving tray means.

---

This invention relates to an improved liquid dispensing container unit wherein the unit can be disposed at the desired location and tend to maintain the liquid at the desired temperature for a relatively long period of time. This invention also relates to an improved serving and supporting part for such a liquid dispensing unit or the like.

In particular, it is well known that various liquid dispensing containers have been provided wherein the containers contain a pressurized beverage, such as beer, soft drinks and the like, with the container being shaped into an attractive keg design so that the ultimate consumer or the like can store such container in a horizontal position on a shelf of a domestic refrigerator or the like to dispense desired quantities of the liquid from the container out through a spigot construction thereof whereby the liquid is fully refrigerated by the refrigerator.

However, it has been found that such liquid dispensing containers are so attractive and convenient, that not only do householders and the like desire to remove such container from the refrigerator and have the same located in a party room or the like so that guests and the like can draw their refreshments as desired without going to the kitchen, but in addition, it has been found that bars, restaurants and the like serve such precooled liquid dispensing containers to the tables where the customers draw their beverage as desired without waiting for the waitress or the like.

Therefore, according to the teachings of this invention, an improved serving and cooling tray is provided for such liquid dispensing containers wherein the serving tray of this invention is not only adapted to support and attractively serve such precooled liquid dispensing containers, but also the serving tray means of this invention is so constructed and arranged that the same carries a heat exchanging medium which tends to maintain the temperature of the served liquid dispensing container at the desired temperature so that the beverage therein will remain at the desired temperature during the use of the liquid dispensing container after being removed from its refrigerated storing compartment.

Accordingly, it is an object of this invention to provide an improved liquid dispensing unit having means to maintain the temperature of the liquid at a desired temperature for a relatively long time, the serving unit of this invention having one or more of the novel features set forth above or hereinafter shown or described.

Another object of this invention is to provide an improved serving and supporting tray means for such a unit or the like, the tray means having one or more of the novel features set forth above or hereinafter shown or described.

Other objects, uses and advantages of this invention are apparent from a reading of this description which proceeds with reference to the accompanying drawings forming a part thereof and wherein.

Figure 1:
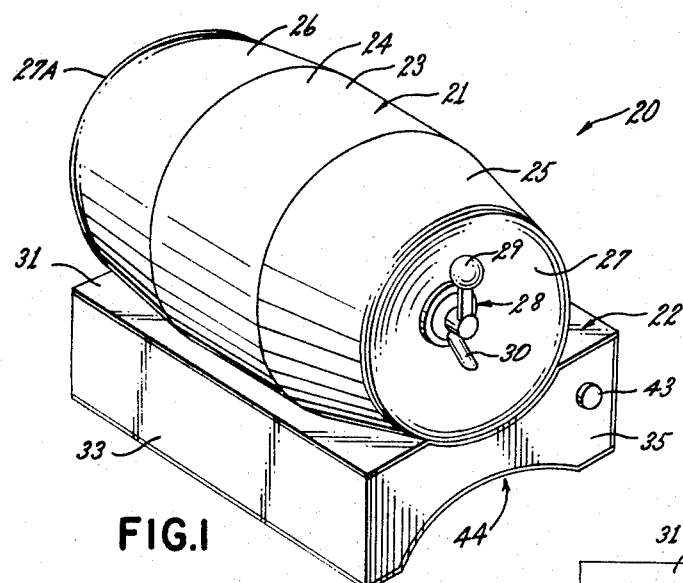
FIGURE 1 is a perspective view of the improved liquid dispensing and temperature maintaining unit of this invention.

While the various features of this invention are hereinafter described and illustrated as providing a unit for tending to cool a liquid, it is to be understood that the various features of this invention can be utilized singly or in any combination thereof to provide a temperature maintaining means for other devices as desired.

Therefore, this invention is not to be limited to only the embodiments illustrated in the drawings, because the drawings are merely utilized to illustrate one of the wide variety of uses of this invention.

Referring now to FIGURE 1, the improved liquid dispensing unit of this invention is generally indicated by the reference numeral 20 and comprises a liquid dispensing container 21 carried by and supported in a dispensing position on a serving tray means 22 of this invention, the serving tray means 22 having means for tending to maintain the temperature of the liquid in the container 21 at a desired temperature in a manner hereinafter described.

The liquid dispensing container 21 is attractively shaped to define a keg structure or the like by having the wall means 23 thereof define an intermediate substantially cylindrical side wall section 24 interconnected to the larger ends of a pair of substantially frusto-conical end sections 25 and 26 respectively having the smaller ends thereof providing a front end wall 27 and a rear end wall 27A for the container 21.

The front end wall 27 of the container 21 is countersunk and carries a spigot construction 28 in the center thereof, the spigot construction 28 having a handle means 29 for opening and closing the spigot construction 28 to selectively dispense the pressurized liquid in the container 21 out of a dispensing spout 30 into a drinking receptacle or the like placed adjacent the bottom of the spout 30.

As previously stated, such liquid dispensing container 21 is normally maintained in a refrigerated compartment to maintain the temperature of the liquid therein at the desired serving temperature. However, should the dispensing container 21 be served at a party table or the like, so that the users can draw their glasses of beverage from the container 21 at will, the precooled beverage in the container 21 will tend to heat up relatively fast to room temperature which will usually make the beverage unpalatable.

However, by utilizing the serving tray means 22 of this invention, the serving tray means 22 not only attractively serves the container 21 to the users and effectively holds the same in its dispensing position, but also the serving tray means 22 of this invention tends to maintain the temperature of the liquid within the container 21 at its serving temperature for a much longer period of time than when the container 21 is served without the serving means 22 of this invention.

Figure 2:
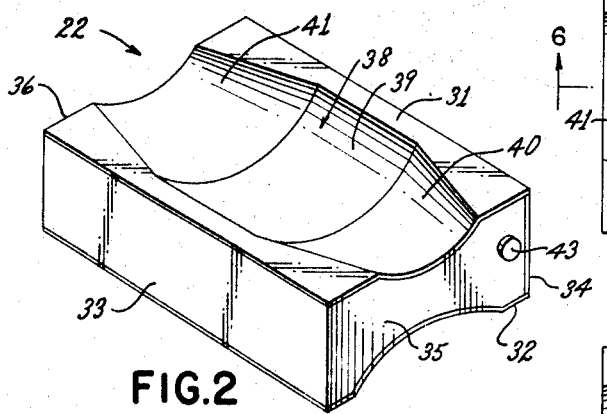
FIGURE 2 is a perspective view of just the serving tray means of the unit of FIGURE 1.

As illustrated in FIGURE 2, the serving tray means 22 of this invention is a substantially rectangular structure having opposed top and bottom wall means 31 and 32, opposed straight side wall means 33 and 34 and opposed straight end wall means 35 and 36.

While the tray means 22 can be formed of any suitable material, it is desirable that the tray means 22 be formed of a material that will readily transfer temperature by conduction. For example, the material forming the tray means 22 illustrated in the drawings is aluminum-containing metallic material whereby the tray means 22 can be formed of sheets of metallic material suitably shaped and formed into the configurations illustrated in FIGURE 2 and fastened together to define the wall means 31–35 which cooperate together to define a chamber 37 within the tray means 22 for a purpose hereinafter described.

The top wall means 31 of the serving tray means 22 is provided with a recess 38 therein so constructed and arranged that the same is adapted to receive part of the configuration of a particular sized container 21 so that the recess 38 will not only hold the container 21 in its liquid dispensing position as illustrated in FIGURE 1, but will also provide intimate contact against the wall means 23 of the container 21 throughout the entire surface area of the recess 38 for heat transfer purposes in a manner hereinafter described.

For example, the recess 38 defines a central cylinder engaging surface 39 and opposed frusto-conical engaging surfaces 40 and 41 with the surfaces 40, 39 and 41 in the top wall means 31 of the serving tray means 22 being adapted to engage the received parts of the sections 25, 24 and 26 of the wall means 23 of the container 21 when the same is disposed in the recess 38 in the manner illustrated in FIGURE 1.

In this manner, the chamber 37 of the serving tray means 22 can contain a heat exchanging medium 42 which, when the container 21 contains a beverage or the like that is to be cooled, will be precooled in a manner hereinafter set forth so that when the container 21 is disposed in the recess 38 and served by the tray means 22, the intimate contact between the surfaces 39, 40 and 41 of the serving tray 22 and the received wall means 23 of the container 21 will transfer heat from the liquid in the dispenser 21 to the chamber 37 to be absorbed by the cooling medium 42 so as to tend to maintain the temperature of the liquid in the container 21 at the desired serving temperature thereof.

Thus, since the wall means 23 of the dispensing container 21 is normally formed of metallic material, such as aluminum-containing metallic material, the wall means 23 of the container 21 and the wall means of the serving tray means 22 of this invention readily transfers heat from the liquid in the container 21 to the heat exchanging medium 42 to permit the liquid dispensing container 21 to be served at a party table or the like and remain thereon for a long period of time without having the temperature of the beverage in the container 21 raised to an unpalatable temperature.

For example, the cooling medium 42 in the chamber 37 of the serving tray means 22 can comprise water disposed in the chamber 37 through a suitable closure plug 43 in the end wall 35.

After the chamber 37 has been filled to the desired level by the heat exchanging medium 42, the serving tray means 22 can be placed in a refrigerated compartment to refrigerate the heat exchanging medium 42.

For example, if the cooling medium 42 is water, the same can be frozen in the compartment 37 of the tray means 22 with the plug means 43 removed to permit expansion of the medium 42 during freezing thereof without forcing the tray means 22 out of shape. Thereafter, the plug means 43 is replaced and when the serving tray means 22 is subsequently utilized with the container 21 in the manner illustrated in FIGURE 1, it can be seen that the cooling medium 42 will maintain the temperature of the beverage within the container 22 at the desired dispensing temperature for a relatively long period of time.

Figure 3:
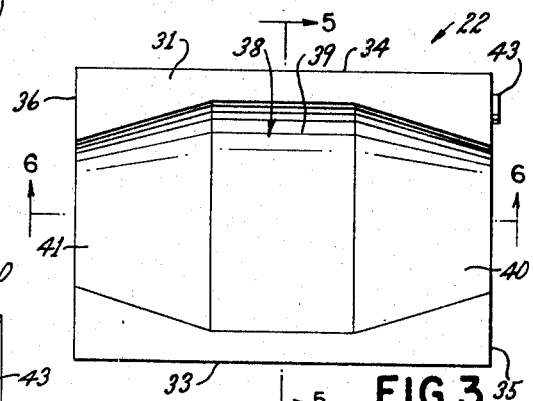
FIGURE 3 is a top view of the tray means of FIGURE 2.
Figure 5:
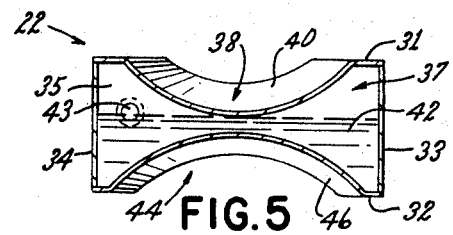
FIGURE 5 is a cross-sectional view taken on line 5—5 of FIGURE 3.
Figure 4:
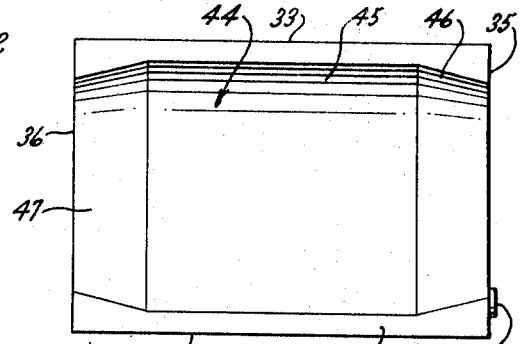
FIGURE 4 is a bottom view of the tray means of FIGURE 2.
Figure 6:
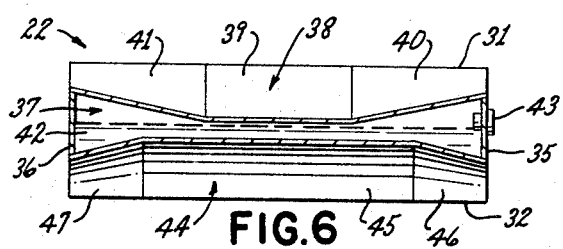
FIGURE 6 is a cross-sectional view taken on line 6—6 of FIGURE 3.
Figure 7:
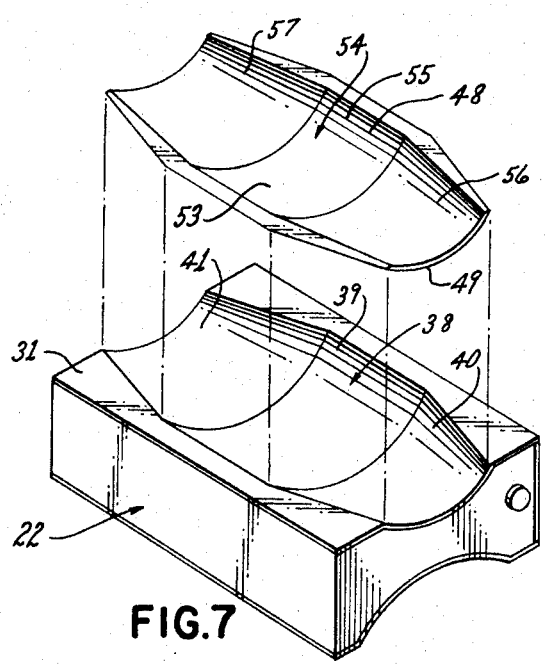
FIGURE 7 is a view similar to FIGURE 2 and illustrates an insert of this invention for cooperating with the serving tray means of FIGURE 2 to convert the same in a manner to hold a different sized liquid dispensing container.
Figure 9:
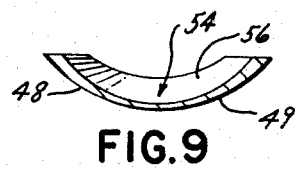
FIGURE 9 is a cross-sectional view taken on line 9—9 of FIGURE 8.
Figure 8:
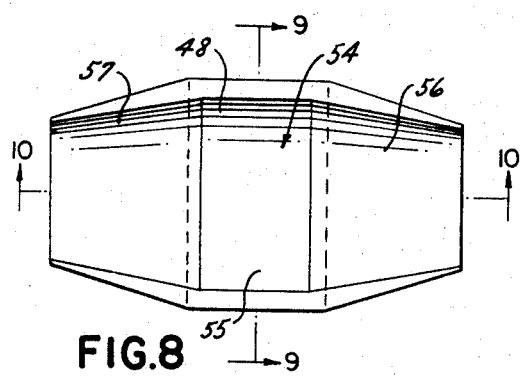
FIGURE 8 is a top view of the insert of FIGURE 7.
Figure 10:
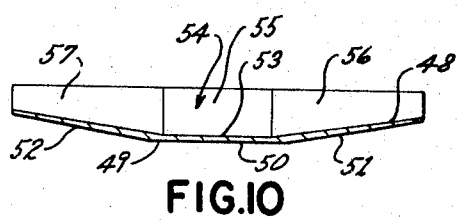
FIGURE 10 is a cross-sectional view taken on line 10—10 of FIGURE 8.

The bottom wall means 32 of the serving tray means 22 of this invention can also be provided with a recess means 44 in substantially the same manner as the recess means 38 except that the recess means 44 defines surfaces 45, 46 and 47 adapted to contact like shaped surfaces on a dispensing container having a different size than the dispensing container 21 that is compatible with the recess 38 in the top wall means 31 of the serving tray means 22. For example, in the embodiment illustrated in FIGURES 3 and 4, it can be seen that the bottom recess means 44 is adapted to accommodate a dispensing container having a configuration similar to the container 21 with the container for the recess 44 being substantially larger than the container 21 for the top recess 38.

Thus, by merely inverting the serving tray means from the position illustrated in FIGURE 2 so as to rest on the wall means 31 thereof, the recess 44 can be utilized for a larger sized container 21.

In any event, it can be seen that regardless of which side 31 or 32 the serving tray means 22 is placed against a supporting structure, the recess 38 or 44 in the bottom thereof greatly reduces the contact area between the serving tray means 22 and the supporting structure to tend to minimize heat transfer between supporting structure and the heat exchanging medium 42.

While the serving tray means 22 is adapted to accommodate two different sized containers 21, the serving tray means 22 can be utilized to accommodate still other different sized liquid dispensing containers 21 by utilizing insert means 48 of this invention illustrated in FIGURES 7–10.

In particular, a particular insert 48 can be formed of solid metallic material, such as aluminum-containing metallic material or the like, and have the configuration illustrated in the drawing to be fully received in the recess 38 of the serving tray means 22 to substantially reduce the resulting recess means therein to accommodate a dispensing container 21 having a smaller size than the dispensing container 21 illustrated in FIGURE 1.

In particular, the insert 48 is so constructed and arranged that the bottom surface means 49 thereof defines a cylinder defining surface 50 and opposed frustoconical defining surfaces 51 and 52 which will intimately engage the surfaces 39, 40 and 41 in the top surface means 31 of the serving tray means 22 when the insert 48 is completely received in the recess 38. In this manner, it can be seen that the top surface means 53 of the insert 48 defines a recess 54 substantially smaller than the recess 38 previously described with the top surface means 53 having a central cylinder defining surface 55 and opposed frusto-conical defining surfaces 56 and 57 to accommodate like shaped sections on a smaller sized dispensing container 21 subsequently disposed in the recess 54 of the insert 48 now carried by the serving tray means 22.

Therefore, it can be seen that by providing different sized inserts 48, the serving tray means 22 of this invention can be adapted to be utilized with many different sized liquid dispensing containers 21 to provide not only the supporting and holding feature illustrated in FIGURE 1, but to also tend to maintain the temperature of the liquid in the particular container 21 at the desired temperature through the intimate metal-to-metal contact between the serving tray means 22, insert 48 and wall means 23 of the container 21.

While the serving tray means 22 of this invention has been previously described as having recess means in both the top and bottom surface means thereof to accommodate two different sized liquid dispensing containers 21 without utilizing an insert 48 of this invention, it is to be understood that the bottom surface means can remain flat and unrecessed, if desired.

Figure 11:
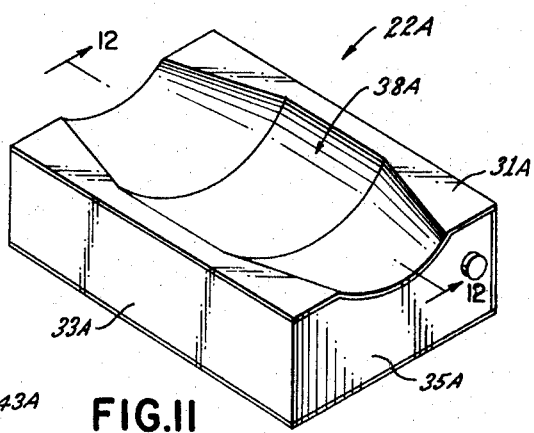
FIGURE 11 is a view similar to FIGURE 2 and illustrates another embodiment of the serving tray means of this invention.
Figure 12:
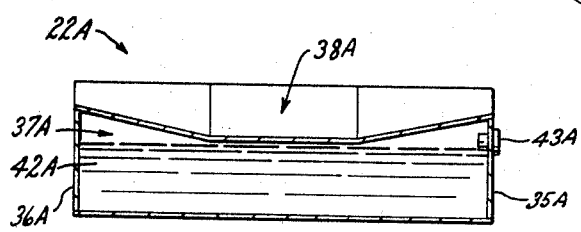
FIGURE 12 is a cross-sectional view taken on line 12—12 of FIGURE 11.

For example, reference is made to FIGURES 11 and 12 wherein another serving tray means of this invention is generally indicated by the reference numeral 22A wherein parts thereof identical to the serving tray means 22 previously described are indicated by like reference numerals followed by the reference letter "A."

As illustrated in FIGURES 11 and 12, the serving tray means 22A only has the previously described recess 38A in the top surface 31A thereof while the bottom surface 32A thereof is flat and unrecessed. In this manner, the volume of the resulting chamber 37A in the serving tray means 22A is substantially increased so that the same can contain a larger quantity of the heat exchanging medium 42A previously described.

In any event, it can be seen that the serving tray means of this invention is not only readily adaptable to support and hold a liquid dispensing container in its proper liquid dispensing position, but also the serving tray means of this invention is readily adaptable to tend to maintain the liquid in the held liquid dispensing container at the desired temperature whether that temperature is to be maintained above room temperature or below room temperature as desired depending upon the temperature of the heat exchanging medium 42 in the serving tray means.

In addition, the serving tray means of this invention is so constructed and arranged that the same is readily adaptable to support and hold various sized liquid dispensing containers by utilizing the insert of this invention without sacrificing the advantages of the temperature maintaining feature thereof.

Accordingly, this invention not only provides an improved liquid dispensing unit, but also this invention provides improved parts for such a unit or the like.

While the form of the invention now preferred has been disclosed as required by statute, other forms may be used, all coming within the scope of the claimed subject matter which follows.

What is claimed is:

1. In combination, a beverage dispensing container having a particular configuration, and a self-contained serving and supporting tray means having lower surface means for resting on a desired support and upper surface means having recess means provided therein and receiving said container therein for holding said container in its dispensing position while the major portion of said container is exposed to view and said container is readily liftable from said tray means, said tray means having a chamber therein for receiving a heat exchanging medium to tend to maintain the beverage in said container at the desired temperature, said recess means conforming to the exact part of the particular configuration of said container that is received therein to provide intimate contact between said container and said upper surface means of said tray means for effective heat transfer therebetween, said container having a continuous side wall means defined by a central cylindrical portion and opposed frusto-conical portions interconnected thereto with the smaller ends thereof defining opposed end walls of said container, said recess received part of said container including part of said cylindrical portion and part of said frusto-conical portions whereby said recess received part of said container is in intimate contact with said upper surface means throughout substantially the entire surface area of said recess received part of said container.

2. A combination as set forth in claim 1 wherein said tray means has opposed end walls and said recess means interrupts said opposed end walls.

3. A combination as set forth in claim 2 wherein said tray means has opposed side walls with said side walls and end walls of said tray means defining a substantially rectangular configuration for said tray means.

4. A combination as set forth in claim 1 and including a heat exchanging medium in said chamber, said heat exchanging medium being cooled while in said chamber by having said chamber filled tray means placed for a predetermined period of time in a refrigerated compartment so that when said tray means is removed from said compartment and receives said container, said cooled heat exchanging medium will tend to maintain said beverage at the desired temperature.

5. A combination as set forth in claim 4 and including opening means on said tray means for insertion and removal of said heat exchanging medium.

6. A self-contained tray means for serving and supporting a beverage dispensing container, said tray means having lower surface means for resting on a desired support and upper surface means having recess means provided therein for receiving said container therein to hold said container in its dispensing position while the major portion of said container will be exposed to view and said container will be readily liftable from said tray means, said tray means having a chamber therein for receiving a heat exchange medium to tend to maintain the beverage in said container at the desired temperature, said recess means conforming to the exact part of the container to be received therein to provide intimate contact between said container and said upper surface means for effective heat transfer therebetween, said recess means having three aligned sections, the middle section being adapted to conform to a cylindrical portion of said container and the end sections being adapted to conform with opposed frusto-conical portions of said container where said frusto-conical portions of said container have the smaller ends thereof defining the opposed end walls of said container whereby the recess received part of the container will be in intimate contact with said upper surface means throughout substantially the entire surface area of said recess received part of said container.

7. A tray means as set forth in claim 6 wherein said tray means has opposed end walls and said recess means interrupts said opposed end walls.

8. A tray means as set forth in claim 7 wherein said tray means has opposed side walls with said side walls and end walls defining a substantially rectangular configuration for said tray means.

9. A tray means as set forth in claim 6 and including a heat exchanging medium in said chamber, said heat exchanging medium being adapted to be cooled while in said chamber by having said chamber filled tray means placed for a predetermined period of time in a refrigerated compartment so that when said tray means is removed from said compartment, said cooled heat exchanging medium will tend to maintain the beverage of the container to be received in said recess means at the desired temperature.

10. A tray means as set forth in claim 9 and including opening means on said tray means for insertion and removal of said heat exchanging medium.

11. In combination, a beverage dispensing container having a particular configuration, and a serving and supporting tray means having lower surface means for resting on the desired support and upper surface means having recess means provided therein and receiving said container therein for holding said container in its dispensing position, said tray means having a chamber therein for receiving a heat exchanging medium to tend to maintain the beverage in said container at the desired temperature, said upper surface means including an insert having said first-named recess means therein and conforming to and being received in a second recess means of said tray means, said second recess means being adapted to receive and support a larger sized beverage dispensing container when said insert is removed.

12. A combination as set forth in claim 11 wherein said insert is a solid member having its lower surface in full contact with the upper surface of said tray means and its upper surface in full contact with said container for effective heat transfer between said container and said tray means.

13. A tray means for serving and supporting a beverage dispensing container, said tray means having lower surface means for resting on a desired support and upper surface means having recess means provided therein for receiving said container therein to hold said container in its dispensing position, said tray means having a chamber therein for receiving a heat exchange medium to tend to maintain the beverage in said container at the desired temperature, said upper surface means including an insert having said first-named recess means therein and conforming to and being received in a second recess means of said tray means, said second recess means being adapted to receive and support a larger sized beverage dispensing container when said insert is removed.

14. A tray means as set forth in claim 13 wherein said insert is a solid member having its lower surface in full contact with the upper surface of said tray means and its upper surface shaped to be in full contact with said container for effective heat transfer between said container and tray means.

References Cited

UNITED STATES PATENTS

| 3,229,478 | 1/1966 | Alonso | 222—146 |
| 3,315,846 | 4/1967 | Landis et al. | 62—400 |
| 3,243,965 | 4/1966 | Jepson | 165—80 |

ROBERT A. O'LEARY, *Primary Examiner.*

C. SUKALO, *Assistant Examiner.*